United States Patent
Schmidt et al.

(10) Patent No.: US 10,137,512 B2
(45) Date of Patent: Nov. 27, 2018

(54) GROOVE CUTTING TOOL

(71) Applicant: General Electric Technology GmbH, Baden (CH)

(72) Inventors: Torsten Schmidt, Berlin (DE); Marco Haake, Berlin (DE); Nebojsa Huskovic, Berlin (DE)

(73) Assignee: General Electric Technology GmbH, Baden (CH)

( * ) Notice: Subject to any disclaimer, the term of this patent is extended or adjusted under 35 U.S.C. 154(b) by 221 days.

(21) Appl. No.: 15/015,620

(22) Filed: Feb. 4, 2016

(65) Prior Publication Data
US 2016/0228957 A1    Aug. 11, 2016

(30) Foreign Application Priority Data

Feb. 5, 2015 (EP) .................................. 15154010

(51) Int. Cl.
| | | |
|---|---|---|
| *B23C 5/24* | (2006.01) | |
| *B23C 3/28* | (2006.01) | |
| *B23C 3/34* | (2006.01) | |
| *B23B 27/16* | (2006.01) | |
| *B23B 29/02* | (2006.01) | |

(Continued)

(52) U.S. Cl.
CPC ........ *B23C 5/2496* (2013.01); *B23B 27/1688* (2013.01); *B23B 29/025* (2013.01); *B23C 3/28* (2013.01); *B23C 3/34* (2013.01); *F01D 11/08* (2013.01); *F01D 25/24* (2013.01); *B23B 2215/76* (2013.01); *B23B 2220/123* (2013.01); *B23C 2220/36* (2013.01); *F05D 2220/30* (2013.01); *F05D 2230/10* (2013.01)

(58) Field of Classification Search
CPC ....... Y10T 82/12; Y10T 82/125; Y10T 82/16; Y10T 82/16131; B23B 2215/76; B23B 2220/123; B23B 27/1688; B23B 29/025; B23C 2220/36; B23C 3/28; B23C 3/34; B23C 5/2496
See application file for complete search history.

(56) References Cited

U.S. PATENT DOCUMENTS 3,771,894 A * 11/1973 Happy ..................... B23C 3/34
                                                    408/54
5,125,299 A *  6/1992 Strait ..................... B23C 3/051
                                                    408/83.5

(Continued)

FOREIGN PATENT DOCUMENTS

| DE | 215 065 C | 10/1909 |
|---|---|---|
| DE | 44 36 239 A1 | 4/1996 |

(Continued)

OTHER PUBLICATIONS

European Search Report dated Jul. 31, 2015.

*Primary Examiner* — Sunil K Singh
*Assistant Examiner* — Nicole N Ramos
(74) *Attorney, Agent, or Firm* — Cynthia W. Flanigan; GPO Global Patent Operation

(57) ABSTRACT

The invention relates to a groove cutting tool having: a body and a holder wherein the holder is slidably mounted in the body. The holder has a first end at which a blade is mounted and a second end, distal in a slidable direction of the holder, from the first end. A drive pinion, located towards the second end, is configured to be in rotational communication with the blade.

4 Claims, 2 Drawing Sheets

(51) Int. Cl.
    *F01D 11/08*        (2006.01)
    *F01D 25/24*        (2006.01)

(56)         References Cited

U.S. PATENT DOCUMENTS 6,098,258  A  *   8/2000  Shimomura ............. B23C 5/08
                                                      29/27 C
    8,276,488  B2    10/2012  Backhouse
    2005/0011924 A1   1/2005  Momose et al.
    2006/0191393 A1   8/2006  Zhang et al.
    2012/0294687 A1  11/2012  Wilmot

FOREIGN PATENT DOCUMENTS

FR            695.607  A   12/1930
    JP          2-303705   A   12/1990
    WO    WO 2011/095823  A1    8/2011

* cited by examiner

GROOVE CUTTING TOOL

TECHNICAL FIELD

The present disclosure relates generally to groove cutting tools suitable for cutting grooves in turbine casings and removing turbine casing sealing strips, seal caulking wires and the like.

BACKGROUND INFORMATION

An axial flow steam turbine typically includes sealing strips and also sealing segments forming part of shaft sealing assemblies. Their function is to provide contact free sealing between the turbine rotor and turbine inner casing in order to avoid a leakage flow. Due to high mechanical and thermal stress, oxidation, corrosion or blade rubbing, sealing strips can be damaged. The result is a higher leakage of the flow area and a decrease of turbine efficiency. In order to prevent the efficiency deficit, the damaged sealing strips have to be replaced.

DE215065C discloses a milling device to cutting slots in wood. The device includes holding plates that contains a cutter mounted at one end. The holding plates themselves are slidably in a body to enable lowering and raising of the cutter and further containing a drive shaft at a distal end of the holder holding plates.

A method of removing such sealing strips is discussed in U.S. Pat. No. 8,276,488. The method involves removing the turbine to a workshop, separating the casing into half-casings, and removing both the stator and rotor blades to access the seal fins and caulking wire. The old fins are then machined down to access the caulking wire which is carefully machined out to avoid damaging the grooves of the half-casings. Replacement fins and caulking wire are then mounted in the grooves, and the replacement fins are machined down to precise clearances from the rotor shaft and blades. A requirement of the tool is that blades rows needs to be removed in order to access the sealing fins. This adds both complexity and time to the task.

SUMMARY

A groove cutting tool is disclosed that can provide a means to removing caulking wires and/or seal strips from turbine cases without the need for removal of rotor blade rows. The disclosure is intended to provide a slim groove cutting tool capable of performing this function.

It attempts to addresses this problem by means of the subject matters of the independent claims. Advantageous embodiments are given in the dependent claims.

One general aspect includes a groove cutting tool comprising a body, and a holder slidable mounted in the body. The holder includes a first end with a blade mounted at the first end and a second end, distal from a slidable direction of the holder from the first end wherein a drive pinion is located towards the second end and is configured to be in rotational communication with the blade.

Further aspects may include one or more of the following features. The blade having a blade diameter and the holder has a width in a direction perpendicular to the slidable direction and parallel to the blade wherein the blade diameter is less than or equal to the width. A shaft mounted to and extending perpendicular from the blade. A bearing mounted on the shaft. An output pinion with a cavity, wherein the shaft extends into the cavity and is fixed to the output pinion within the cavity. A bearing mounted on the shaft in the cavity. A portion of the holder extending into the cavity such that the bearing is fixed between the portion and the shaft so as to enable rotation relative to the holder, as a unit, of the shaft, output pinion and blade. At least one transmission bolt fixing the output pinion to the shaft. A drive directly mounted on the drive pinion and configured to rotate the drive pinion relative to the holder.

The slim and compact nature of the groove cutting tool enables it to be used in conjunction with a large variety of basic machines, including carousel turning machines, stationary milling machines and mobile machines that comprise boring bars that act as a point of rotation of the groove cutting tool.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
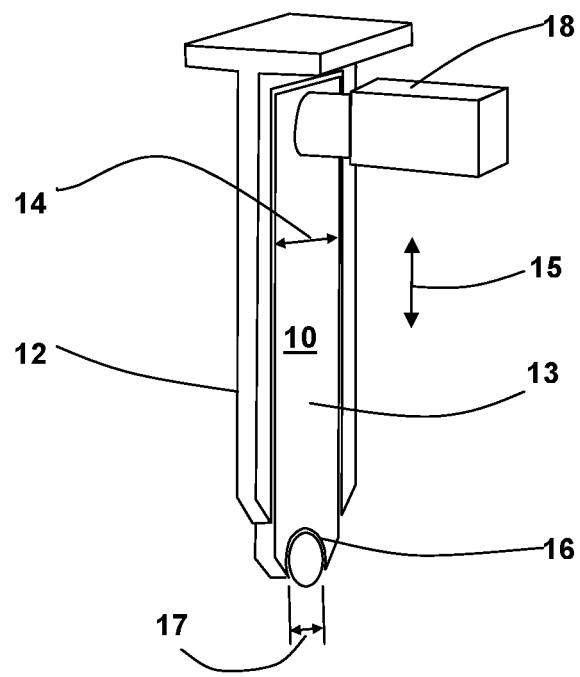
FIG. 1 is a schematic a groove cutting tool according to an exemplary embodiment of the disclosure.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

An exemplary embodiment of a groove cutting tool 10 shown in FIG. 1 has a body 12 in which is slidable mounted a holder 13.

The sliding mounting of the holder 13 makes it possible to finely adjust the distance of the tool to a cutting surface. This adjustment may be made automatically with the assistance of sensor, by means of an adjustment mechanism such as a gear and/or motor or else my manual means, including the use of adjustment pins (not shown) to fix the relative slidable position of the holder 13 to the body 12.

In an exemplary embodiment shown in FIG. 1 the holder 13 has a first end at which a blade 16 is mounted and a second end, distal, in a slidable direction 15 of the holder from the first end, at which a drive pinion 20, located towards the second end, is located.

Figure 2:
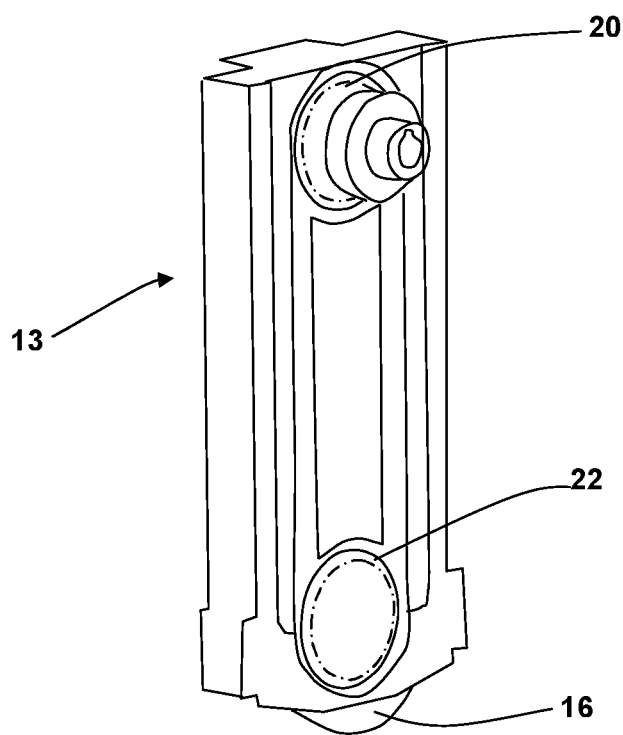
FIG. 2 is an exploded view of a slidable holder of the groove cutting tool of FIG. 1.

The drive pinion 20 is configured to be in rotational communication with the blade. In an exemplary embodiment shown in FIG. 2 this is achieved by the holder 13 additionally having an output pinion 22 attached to the blade 16 wherein the drive pinion 20 is in rotational communication with the output pinion 22. In an exemplary embodiment, this is achieved by a belt or chain between the drive pinion 20 and the output pinion 22. In another not shown exemplary embodiment, the drive pinion 20 and the output pinion 22 are connected by gears. The distal, that is non concentric, location of the drive 18 from the output pinion 22 makes it possible to minimise the thickness of the groove cutting tool 10 at the blade 16 end of the groove cutting tool 10 enabling the tool to be used between turbine rotor blades without removal of the blades.

In an exemplary embodiment shown in FIG. 1, the blade 16 has a blade diameter 17 and slot has a width 15 in a direction perpendicular to the slidable direction 15 and parallel to the blade wherein the blade diameter is less than or equal to the width 14. Not only does this enable slidable retraction of the blade 16 into the holder 13 but also makes it possible to shield the blade 16 so that only a portion of the blade 16 is exposed. This may have the advantage of increase personnel safety.

Figure 3:
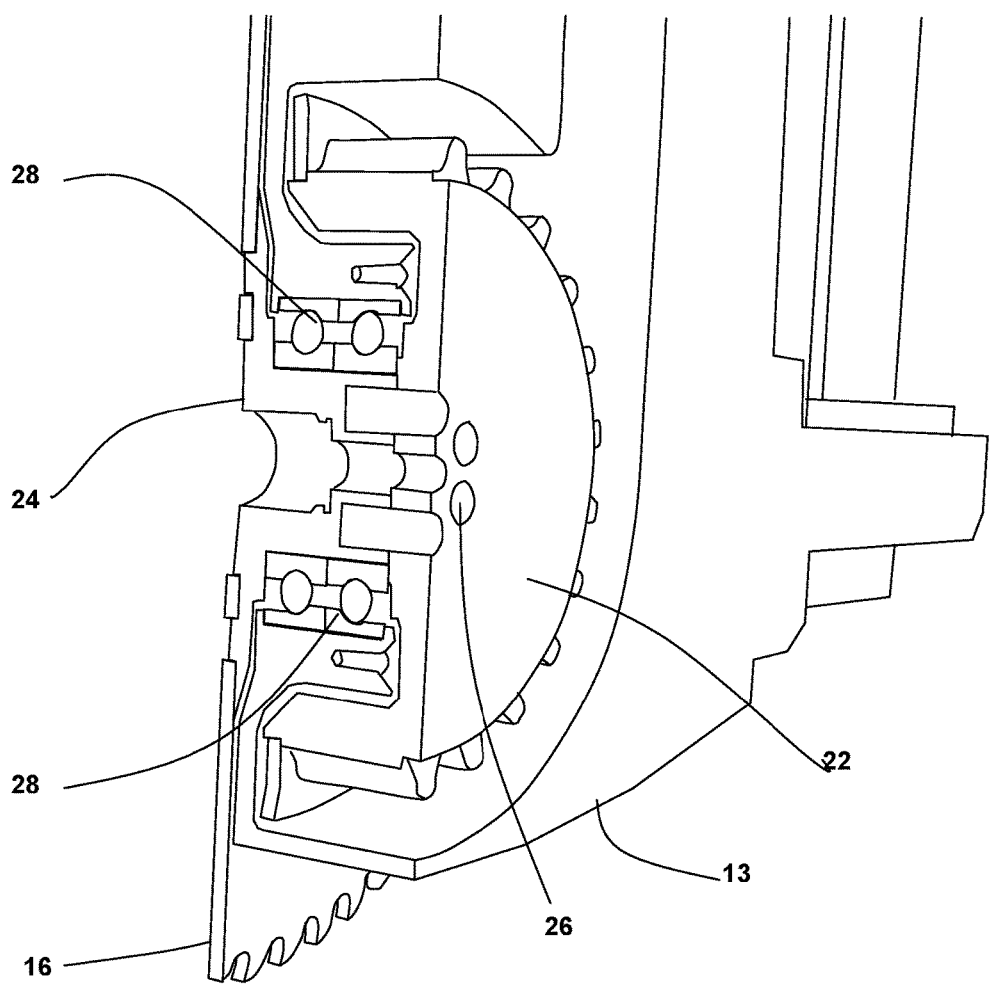
FIG. 3 is an exploded view of a connection between the output pinion and blade of the groove cutting tool of FIG. 1

In an exemplary embodiment shown in FIG. 3, the groove cutting tool 10 has a shaft 24 mounted to and extending perpendicular from the blade 16. A bearing 28 is additionally mounted on the shaft 24. The output pinion 22 has a cavity in which the shaft 24 extends such that the output pinion 22 is connected to the shaft 24 in the cavity while the bearing 28 is at least partially located within the cavity. A portion of the holder 13 additionally extends to act as a second fixing point for the bearing 28. In this way, the bearing 28 is fixed between the portion of the holder 13 and the shaft 24 so as to enable rotation relative to the holder 13, as a unit, of the shaft 24, the output pinion 22 and the blade 16. This configuration provides an additional opportunity to minimise the thickness of the tool at the blade 16 end of the groove cutting tool 10.

In an exemplary embodiment shown in FIG. 3 the output pinion 22 is fixed to the shaft 24 by means of a plurality of transmission bolts 26 so as to provide a compact and thin yet reliable fixing means. The fixing of the shaft 24 to the output pinion 22 is not, however, limited to this means and may be fixed by other known means including screw means and/or by shrink fit.

Although the disclosure has been herein shown and described in what is conceived to be the most practical exemplary embodiment the present disclosure can be embodied in other specific. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

REFERENCE NUMBERS 10 groove cutting tool
12 body
13 holder
14 width
15 slidable direction
16 blade
17 blade diameter
18 drive
20 drive pinion
22 output pinion
24 shaft
26 transmission bolt
28 bearing

We claim:

1. A groove cutting tool comprising:
a body; and
a holder slidably mounted within the body, the holder having:
    a first end;
    a blade mounted at the first end;
    a second end, distal, in a slidable direction of the holder, from the first end;
    a drive pinion, located towards the second end, configured to be in rotational communication with the blade; and
wherein the groove cutting tool further includes:
    a shaft mounted to and extending perpendicular from the blade;
    a bearing mounted on the shaft;
    an output pinion with a cavity, wherein the shaft extends into the cavity and is fixed to the output pinion within the cavity; and
    a portion of the holder extends into the cavity such that the bearing is fixed between the portion and the shaft within the cavity so as to enable rotation relative to the holder, as a unit, of the shaft, the output pinion and the blade.

2. The groove cutting tool of claim 1, wherein the blade has a blade diameter and the holder has a width in a direction perpendicular to the slidable direction and parallel to the blade, and wherein the blade diameter is less than or equal to the width.

3. The groove cutting tool of claim 1 wherein the output pinion is fixed to the shaft by at least one transmission bolt.

4. The groove cutting tool of claim 1 comprising:
a drive directly mounted on the drive pinion and configured to rotate the drive pinion relative to the holder.

* * * * *